UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE-RHINE, GERMANY, A CORPORATION.

RESINOUS PRODUCT AND PROCESS OF MAKING SAME.

No. 898,307.            Specification of Letters Patent.            Patented Sept. 8, 1908.

Application filed April 3, 1908. Serial No. 425,012. (Specimens.)

*To all whom it may concern:*

Be it known that I, RENÉ BOHN, doctor of philosophy and chemist, citizen of the Swiss Republic, residing at Mannheim, Germany, have invented new and useful Improvements in Resinous Products and Processes of Making Same, of which the following is a specification.

According to Grabowski (*Berichte der Deut. Chem. Ges.*, 7, 1605) dinaphthylmethane is the principal product obtained by treating naphthalene with methylal in the proportion of one-third of a molecular proportion of methylal to one molecular proportion of naphthalene in the presence of concentrated sulfuric acid. I have discovered that different and valuable products can be obtained by reacting in the presence of acid on one molecular proportion of naphthalene, with more than half a molecular proportion of formaldehyde, or—what is equivalent for the purposes of my invention—of a substance evolving formaldehyde. Preferably not much less than one molecular proportion (say seven-eighths thereof) of formaldehyde is employed, but more than one molecular proportion can be used. The temperature of the reaction can be buried within wide ranges and the reaction can be carried out in the presence, or absence, of diluting agents, or fluxes. The products obtained are similar to natural resins and can be used either in the raw state, or after purification, in the production of varnish, sealing wax, impregnating agents, and other compounds. They are specially characterized by being insoluble in water, alcohol, turpentine, and linseed oil, and soluble in benzene, toluene, xylene, naphtha, and chlorbenzene.

The following examples will serve to illustrate further the nature of my invention and how it can be performed, but it is not confined to these examples. The parts are by weight.

Example 1. Dissolve one hundred (100) parts of naphthalene in from four hundred (400), to six hundred (600), parts of chloroform, add from fifty-four (54), to sixty (60), parts of methylal and then, while stirring in a reflux apparatus, add, gradually, two hundred (200) parts of ninety-seven (97) per cent. sulfuric acid, whereupon the temperature rises to about forty (40) degrees centigrade. Gradually raise the temperature in from one (1), to two (2), hours to from fifty (50), to sixty (60), degrees centigrade, then add water to the melt and distil over the chloroform by means of steam. Filter off the residue and free it from acid by washing and grinding while wet. The product so obtained can be used directly or it can be purified by dissolving it in benzene, chlorbenzene, or similar solvent, filtering and evaporating off the solvent and finally heating for a short time at about two hundred (200) degrees centigrade. The final product is, when cold, a yellow-brown glassy mass which, when ground, is a yellowish white powder.

Example 2. Introduce one hundred (100) parts of powdered naphthalene, while stirring, into a mixture of eighty (80) parts of thirty (30) per cent. formaldehyde solution and from one hundred and ten (110), to one hundred and fifteen (115), parts of ninety-seven (97) per cent. sulfuric acid. Then raise the temperature gradually to one hundred (100) degrees centigrade and maintain this temperature, if necessary cooling to remove the excess of heat generated by the reaction. After about one hour and a half (90 minutes) the mixture becomes thick, then take up with hot water and decant the aqueous liquid, allow the product to cool, and grind while wet, and filter and wash with water till the product is free from acid. In order to purify the raw product, dissolve it in benzene, or nitrobenzene, or chlorbenzene, and precipitate with a little alcohol, or ether, or acetone, any unaltered naphthalene remaining in solution. The purification can also be effected by extraction with boiling acetone, or ether. The purified condensation product is similar to that obtained according to the first example.

Example 3. Introduce one hundred (100) parts of powdered naphthalene into a mixture of seventy (70) parts of thirty (30) per cent. formaldehyde solution and one hundred (100) parts of ninety-seven (97) per cent. sulfuric acid; then, while well stirring, heat to from one hundred and twenty (120), to one hundred and forty (140), degrees centigrade and maintain the temperature till the mixture becomes a viscous paste and then work up according to the second example.

Example 4. Dissolve one hundred (100) parts of naphthalene in from three hundred (300), to four hundred (400), parts of chloroform, add one hundred and twenty (120) parts of methylal and then, while stirring and cooling, allow two hundred (200) parts of ninety-seven (97) per cent. sulfuric acid to run into the mixture. Stir for twelve (12) hours at ordinary temperature, take up with water, distil off the chloroform with steam and work up according to the second example.

Example 5. Introduce one hundred (100) parts of powdered naphthalene into a mixture of from one hundred and forty (140), to one hundred and sixty (160), parts of thirty (30) per cent. formaldehyde solution and from two hundred (200), to two hundred and thirty (230), parts of ninety-seven (97) per cent. sulfuric acid, and stir, while heating at about one hundred and thirty (130) degrees centigrade. The reaction is complete when the mixture becomes a viscous mass. The raw product can be purified, for example, by dissolving it in benzene, or chlorbenzene, shaking the solution with milk of lime, or soda, and precipitating the clear solution with alcohol, acetone, or ether.

In the foregoing examples, the sulfuric acid can be replaced by other mineral acid, or by an organic acid.

What I claim is:

1. The process of producing a product resembling resin by reacting in the presence of acid on one molecular proportion of naphthalene with more than half a molecular proportion of formaldehyde.

2. The process of producing a product resembling resin by reacting in the presence of acid on one molecular proportion of naphthalene with seven-eighths of a molecular proportion of formaldehyde.

3. As a new article of manufacture a product resembling resin obtainable by reacting in the presence of acid on one molecular proportion of naphthalene with more than half a molecular proportion of formaldehyde, which product is insoluble in water, alcohol, turpentine, and linseed oil, and soluble in benzene, toluene, xylene, naphtha, and chlorbenzene.

In testimony whereof I have hereunto set my hand in the presence of two subscribing witnesses.

RENÉ BOHN.

Witnesses:
  J. ALEC. LLOYD,
  JOS. H. LEUTE.